United States Patent [19]

Wischniewski

[11] Patent Number: 4,519,320
[45] Date of Patent: May 28, 1985

[54] DEVICE FOR BURNING A COAL-CONTAINING ASH-RICE SLUDGE

[75] Inventor: Martin Wischniewski, Krefeld, Fed. Rep. of Germany

[73] Assignee: Deutsche Babcock Anlagen Aktiengesellschaft, Oberhausen, Fed. Rep. of Germany

[21] Appl. No.: 424,953

[22] Filed: Sep. 27, 1982

[30] Foreign Application Priority Data

Oct. 3, 1981 [DE] Fed. Rep. of Germany ....... 3139409

[51] Int. Cl.³ .............................................. F23G 7/04
[52] U.S. Cl. ..................................... 110/238; 110/224
[58] Field of Search ............... 110/224, 229, 232, 238, 110/346, 347

[56] References Cited

U.S. PATENT DOCUMENTS

| | | | |
|---|---|---|---|
| 3,472,186 | 10/1969 | Osterman | 110/346 |
| 4,324,544 | 4/1982 | Blake | 110/347 |
| 4,330,411 | 5/1982 | Florim et al. | 110/346 |
| 4,354,825 | 10/1982 | Fisher et al. | 110/224 |

Primary Examiner—Edward G. Favors
Attorney, Agent, or Firm—Michael J. Striker

[57] ABSTRACT

Disclosed is a device for firing waste sludge in a coal-gasifying process by means of two separate dust fireboxes connected respectively to a fume gas drier and to a heat energy generator in the form of a steam boiler. To prevent caking of the ashes, fume gases in the second firebox are cooled down by the admixture of waste gases fed back from the heat energy generator. In this manner, the amount of the exhausted waste gas is reduced and steam production is increased.

3 Claims, 2 Drawing Figures

DEVICE FOR BURNING A COAL-CONTAINING ASH-RICE SLUDGE

CROSS-REFERENCE TO RELATED APPLICATION

Reference is had to copending application of Martin Wischniewski et al., Ser. No. 390,896, filed June 22, 1982 for "Method of and Device for Burning a Coal-Containing Ash-Rich Sludge," the entire specification of which is incorporated herein.

BACKGROUND OF THE INVENTION

The present invention relates to a device for firing a coal-containing, ash-rich sludge produced in a coal-gasifying process by means of a gas-fueled first firebox having an outlet for fume gases, a drier for a fluidized stream of the sludge having an inlet connected to the fume gas outlet of the first firebox to utilize heat energy of the waste gas for drying the fluidized sludge stream, an additional firebox fueld with a dried pulverized sludge and having an outlet for waste gases connected to means for recovering heat energy.

In burning waste sludge generated in a coal-gasifying process it is of uppermost importance to achieve a high degree of combustion, not only for the sake of a high heat yield but also, in the first place, to achieve residual carbon in the ashes of less than 5%, as necessary for utilization of the ashes as a raw material for construction materials. In order to obtain such a high combustion, the firing temperature should be as high as possible. On the other hand, at a high combustion temperature, the ashes liquefy. In order to prevent caking of ashes it is necessary to cool down hot flue gases loaded with ashes before they come into contact with the wall of the firing space.

According to referenced application Ser. No. 390,896, the cooling of fuel gases takes place in the first dust firebox by means of admixing to the fuel gases recirculated waste gas from a drier for a fluidized stream of the sludge. In the second firebox, the waste gas is cooled by feeding fresh air.

SUMMARY OF THE INVENTION

It is an object of the present invention to provide an improved heat utilization in the burning device of the aforedescribed type.

In keeping with this object, in a device for firing a coal-containing, ash-rich sludge having a drier for a fluidized stream of the sludge provided with a first dust fuel firebox and a heat energy generator such as a steam boiler provided with a second dust fuel firebox, one feature of the invention resides in the provision of return conduit means for feeding waste gas from the heat energy generator to the dust fuel firebox for the latter.

Only such an amount of ambient air is now admitted into the second firebox as is necessary for the combustion process. Hot fuel gases, due to the admixture thereof with the fed back waste gas from the heat generating boiler, the temperature of which is between 180° and 200° C., is cooled down to a temperature at which dry ashes will result. In this manner the discharge of unused hot waste gases into the outside atmosphere is substantially reduced, and accordingly heat losses are avoided.

The novel feature which is considered characteristic for the invention is set forth in the appended claim. The invention itself, however, both as to its construction and its method of operation, together with additional objects and advantages thereof, will be best understood from the following description of a specific embodiment when read in connection with the accompanying drawing.

DESCRIPTION OF THE PREFERRED EMBODIMENT

Figure 1:
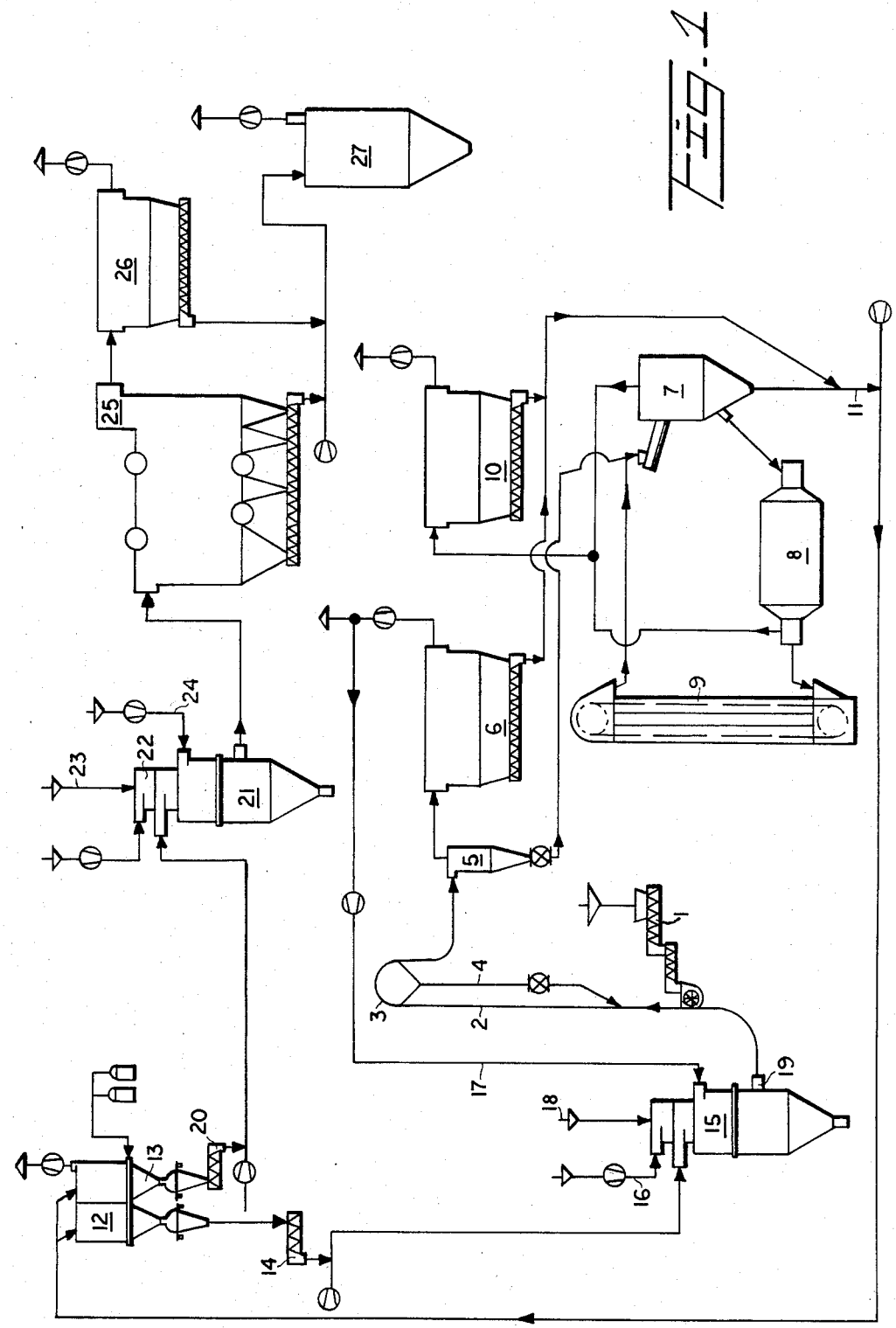
FIG. 1 illustrates schematically a plant for the combustion of sludge.

FIG. 1 depicts a part of the device according to U.S. patent application Ser. No. 390,896, which is affected by this invention.

The device includes a first firebox 15 fueled with a dried pulverized sludge conveyed through conduit 11 into bins 12 and 13. The first firebox 15 also includes an outlet 19 for waste or flue gas produced during firing. The outlet 19 is connected to a tubular drier 2 for drying a stream of fluidized sludge which is continuously delivered from conveyor 1.

Figure 2:
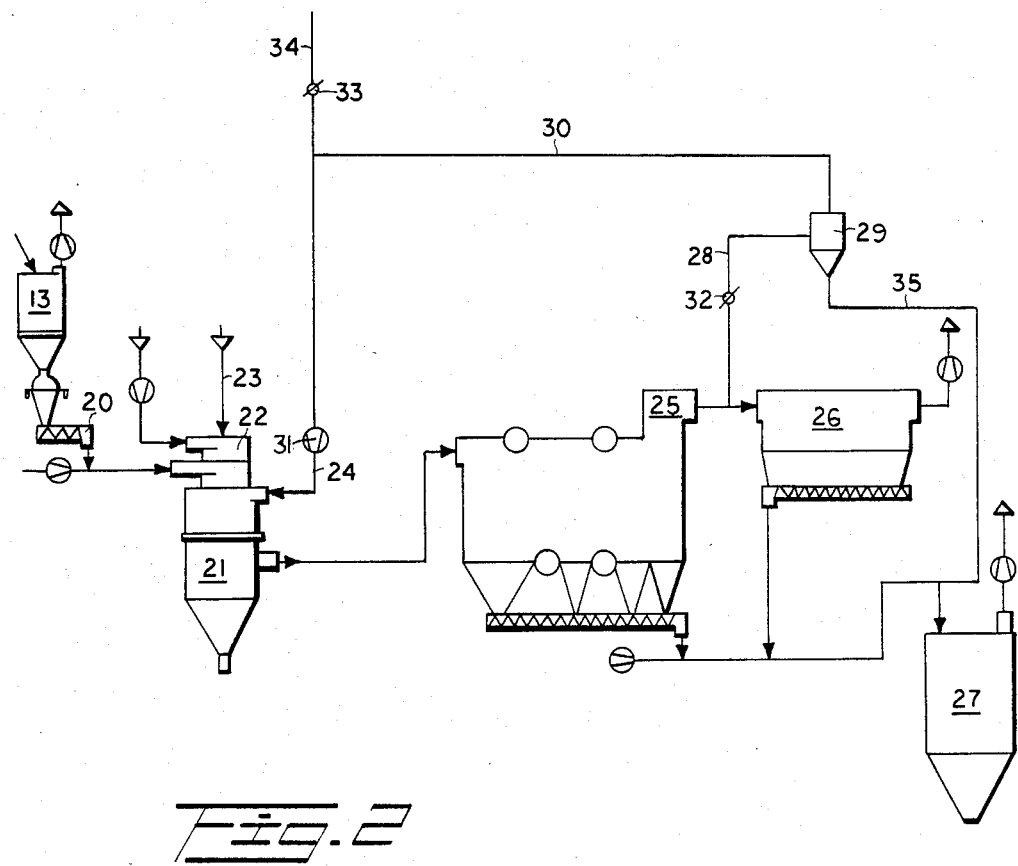
FIG. 2 illustrates a part of the plant of FIG. 1 including the second firebox with the associated steam boiler and conduit means according to this invention.

Referring now to FIG. 2, dried sludge material to be combusted is stored in a bin 13 and is fed through a dosing device 20 to second dust fueled firebox 21. The firebox 21 has a primary air inlet 22, an ignition burner 23, and an additional inlet connection 24. Flue gases discharged from firebox 21 reach at a temperature of 1100° to 1200° C. a heat generating steam boiler 25. All ashes are entrained as fluidized ashes. Waste or exhaust gas from boiler 25 cools down to a temperature of about 200° C. and is branched into two partial streams. One partial stream is separated from the entrained ashes in a filter 26 and is discharged into the atmosphere. Ashes collected in filter 26, together with ashes separated in boiler 25, are pneumatically conveyed to an ash storing silo 27.

The other partial stream is delivered through conduit 28 to a cyclone separator 29 where the waste gas stream is separated from coarse dust particles and is fed through conduit 30 to a blower 31 which blows the purified stream through inlet conduit 24 into the second firebox 21.

The branch conduit 28 from the boiler 25 is provided with a regulating valve 32 which controls the amount of the recirculated part of the waste gas. Conduit 30 communicates with a conduit 34 which is also provided with a regulating valve 33. The conduit 34 serves for sucking in ambient air during the starting phase of the entire device.

As mentioned before, pneumatic conveyor conduit 35 is connected to the bottom of the cyclone 29 and opens into the ash storing silo 27. In the following examples, there is compared a heat balance computed for the device according to the referenced application Ser. No. 390,896 with the heat yield in the device according to this invention.

In both examples, the following operational parameters are common:

| | |
|---|---|
| Weight rate of flow of pure material | 18,236 kg/h |
| Coal contents of the fuel material | 38.15% |

-continued

| | |
|---|---|
| Weight rate of flow of combustion air | 97,440 kg/h |
| Temperature of combustion air | 20° C. |
| Firing temperature | 1810° C. |
| Flue gas temperature at the input to the heat generating boiler | 1100° C. |

The two examples differ from one another in the following operational parameters:

| | Prior Device | Present Device |
|---|---|---|
| Additional air or re-circulated waste gas | 79,452 kg/h | 89,067 kg/h |
| Amount of flue gases | 183,902 kg/h | 193,021 kg/h |
| Amount of waste gases in chimney | 183,902 kg/h | 103,954 kg/h |

It is apparent that the amount of flue gases available for the steam generation according to this invention is increased about 5%. The amount of unused waste gases discharged through the chimney is reduced more than 40%.

It will be understood that each of the elements described above, or two or more together, may also find a useful application in other types of constructions differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for burning waste sludge produced during a coal-gasifying process, comprising two separate gas fueled fireboxes each having an inlet for feeding-in waste sludge to be burned and an outlet for fume gases, a fume gas drier connected to the fume gas outlet of one firebox for drying waste sludge prior to its feeding into said inlets, a heat energy generator connected to the fume gas outlet of the second firebox, and means for feeding back waste gas from the heat energy generator to said second firebox.

2. A device as defined in claim 1, wherein said means for feeding back the waste gas includes an additional inlet to the second firebox, a branch conduit leading from the heat generator to the additional inlet, and a cyclone separator connected in series with the branch conduit for separating ashes from the waste gas.

3. A device as defined in claim 3 further comprising a regulating valve connected in said branch conduit between said heat generator and said cyclone separator.

* * * * *